US011395036B2

(12) United States Patent
Brice et al.

(10) Patent No.: US 11,395,036 B2
(45) Date of Patent: Jul. 19, 2022

(54) AUTOMATIC ANNOTATION OF VIDEO QUALITY IMPAIRMENT TRAINING DATA FOR GENERATING MACHINE LEARNING MODELS OF VIDEO QUALITY PREDICTION

(71) Applicant: ARRIS Enterprises LLC, Suwanee, GA (US)

(72) Inventors: Pierre A. Brice, Edison, NJ (US); Wayne D. Woodruff, Chalfont, PA (US); Olga Malysheva, Lansdale, PA (US); Robert Begley, Great Meadows, NJ (US)

(73) Assignee: ARRIS Enterprises LLC, Suwanee, GA (US)

( * ) Notice: Subject to any disclaimer, the term of this patent is extended or adjusted under 35 U.S.C. 154(b) by 83 days.

(21) Appl. No.: 16/942,186

(22) Filed: Jul. 29, 2020

(65) Prior Publication Data

US 2021/0037284 A1    Feb. 4, 2021

Related U.S. Application Data

(60) Provisional application No. 62/879,698, filed on Jul. 29, 2019.

(51) Int. Cl.
*H04N 21/44* (2011.01)
*H04N 21/4402* (2011.01)
*G06V 20/20* (2022.01)

(52) U.S. Cl.
CPC ....... *H04N 21/44008* (2013.01); *G06V 20/20* (2022.01); *H04N 21/440254* (2013.01)

(58) Field of Classification Search
CPC ..... H04N 21/44008; H04N 21/440254; G06K 9/00671; G06V 20/20
See application file for complete search history.

(56) References Cited

U.S. PATENT DOCUMENTS

| 9,674,562 | B1* | 6/2017 | Spracklen | .......... | H04N 21/4622 |
| 2003/0026422 | A1* | 2/2003 | Gerheim | ............ | H04N 21/8358 |
| | | | | | 380/210 |
| 2020/0322694 | A1* | 10/2020 | Colligan | ............ | H04N 21/8547 |

* cited by examiner

*Primary Examiner* — Randy A Flynn
(74) *Attorney, Agent, or Firm* — Panitch Schwarze Belisario & Nadel LLP (57) ABSTRACT

Exemplary embodiments are directed to methods and systems for annotating generating training data for video quality impairment detection. A video stream recorder extracts one or more image frames from a reference video stream as it is played. A video image labeler embeds a unique label into each of the one or more extracted image frames. The video stream recorder records the one or more labeled image frames as a labeled video stream. The video stream player then plays the labeled video stream through an impaired communication channel to generate a degraded video stream. A video image comparator compares one or more corresponding frames of the labeled video stream and the degraded video stream to generate one or more difference frames. An impaired image recorder annotates at least one of the one or more difference frames according to a corrupted region of the at least one difference frame.

18 Claims, 6 Drawing Sheets

AUTOMATIC ANNOTATION OF VIDEO QUALITY IMPAIRMENT TRAINING DATA FOR GENERATING MACHINE LEARNING MODELS OF VIDEO QUALITY PREDICTION

FIELD

The present disclosure relates to systems and methods for automatically generating macroblock annotations for artificial intelligence-based training video quality prediction systems.

BACKGROUND

In addition to providing video content at high speeds, it is important for cable operators to deliver high quality video content to subscribers. In order to sustain high quality video, multiple system operators (MSO), content creators, content providers, and content delivery platforms (HBO, Netflix, Amazon Video, etc.) need adequate tools to measure, modify, and monitor video quality on a network. Numerous methods for testing and monitoring tasks rely on human monitoring. These techniques can be labor intensive because determining the quality of a new rendering requires a comparison with one or more established references. In addition, advancements in technology make it difficult for established references to keep pace. For example, these solutions rely on painstaking and time-consuming human reviewing of video content to accumulate a reliable library of dependable reference content to be used for comparison in video quality testing and monitoring.

With the advent of machine learning, computer vision (CV) technology has expanded the capability for image analysis. CV algorithms based on Deep Convolutional Neural Networks (DCNNs) can provide robust image detection and segmentation analysis. DCNNs require hundreds of thousands to millions of quality samples. As with human monitoring, the generation of training data for CV algorithms can be impractical due to the heavy data collection requirements which includes annotation of training samples. As such, there may be insufficient reference data for a CV algorithm use to learn or gain understanding from images for a particular application.

SUMMARY

An exemplary method for generating training data for video quality impairment detection is disclosed, comprising: playing, via a video stream player, a video stream over a first communication channel; extracting, via a video stream recorder, one or more image frames from the video stream being played; embedding, via a video image labeler, a unique label into each of the one or more extracted image frames; recording, via a video stream recorder, the one or more labeled image frames as a labeled video stream; inputting, via a transmission noise generator, random noise into a second communication channel to form an impaired communication channel; playing, via the video stream player, the labeled video stream through the impaired communication channel to generate a degraded video, wherein the impaired communication channel distorts one or more elements of the one or more labeled frames of the labeled video stream with the random noise; comparing, via a video image comparator, one or more corresponding frames of the labeled video stream and the degraded video stream to generate one or more difference frames; and annotating, via an impaired image recorder, at least one of the one or more difference frames according to a corrupted region of the at least one difference frame, wherein the corrupted region corresponds to a non-empty pixel of the at least one difference frame.

An exemplary system for generating training data for video quality impairment detection is disclosed, comprising: one or more processing devices configured to: play, via a video stream player, a reference video stream over a first communication channel; extract, via a video stream recorder, one or more image frames from the video stream being played; embed, via a video image labeler, a unique label into each of the one or more extracted image frames; record, via a video stream recorder, the one or more labeled image frames as a labeled video stream; input, via a transmission noise generator, random noise into a second communication channel to form an impaired communication channel; play, via the video stream player, the labeled video stream through the impaired communication channel to generate a degraded video stream, wherein the impaired communication channel distorts one or more elements of the one or more labeled frames of the labeled video stream with the random noise; compare, via a video image comparator, one or more corresponding frames of the labeled video stream and the degraded video stream to generate one or more difference frames; and annotate, via an impaired image recorder, at least one of the one or more difference frames according to a corrupted region of the at least one difference frame, wherein the corrupted region corresponds to a non-empty pixel of the at least one difference frame.

An exemplary non-transitory computer readable medium storing program code for causing one or more processors to perform operations is disclosed, the operations comprising: playing, via a video stream player, a video stream over a first communication channel; extracting, via a video stream recorder, one or more image frames from the video stream being played; embedding, via a video image labeler, a unique label into each of the one or more extracted image frames; recording, via a video stream recorder, the one or more labeled image frames as a labeled video stream; inputting, via a transmission noise generator, random noise into a second communication channel to form an impaired communication channel; playing, via the video stream player, the labeled video stream through the impaired communication channel to generate a degraded video, wherein the impaired communication channel distorts one or more elements of the one or more labeled frames of the labeled video stream with the random noise; comparing, via a video image comparator, one or more corresponding frames of the labeled video stream and the degraded video stream to generate one or more difference frames; and annotating, via an impaired image recorder, at least one of the one or more difference frames according to a corrupted region of the at least one difference frame, wherein the corrupted region corresponds to a non-empty pixel of the at least one difference frame.

BRIEF DESCRIPTION OF THE DRAWINGS

Exemplary embodiments are best understood from the following detailed description when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

Exemplary embodiments of the present disclosure provide a solution for video quality testing and monitoring. In particular, exemplary systems and methods described herein can be used to generate training data for detecting video quality impairment. Video quality impairment can include upscaling artifacts, ringing, blur, visible aliasing artifacts from improper downscaling, compression artifacts resulting from compressed encodes, corruption due to encoding errors, staggering from dropped frames, combing or zipper artifacts from interlaced encoding, and other known distortion types that adversely impact video quality. The training data according to exemplary embodiments of the present disclosure can support no reference, full analysis video quality measurement which can be deployed anywhere in the network to detect one or more of the aforementioned distortions. The resulting training data is reliable and can be generated quickly and efficiently and used in CV applications for video quality impairment detection of distortions, such as macroblocking, image tiling, blurriness, and other degradations in video quality as desired.

Figure 1:
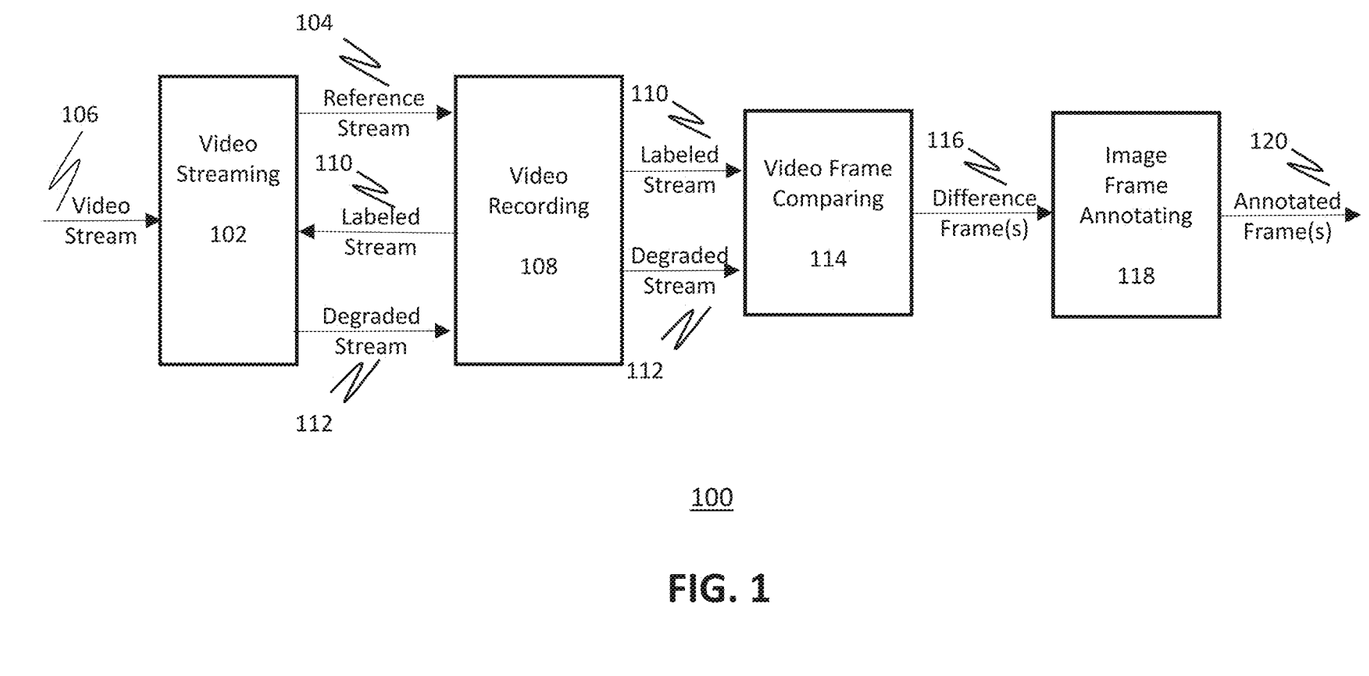
FIG. 1 illustrates a data flow for annotating training data for video quality impairment detection in accordance with an exemplary embodiment of the present disclosure.

FIG. 1 illustrates a data flow 100 for annotating training data for video quality impairment detection in accordance with an exemplary embodiment of the present disclosure.

According to exemplary embodiments of the present disclosure, the data processing can be performed through a combination of hardware and software components provided in one or more processors of a computing device or one or more computing devices. As shown in FIG. 1, the data flow can include video streaming feature 102 in which reference video data (e.g., video stream) of a known quality can be selected automatically by the system according to predetermined rules or can be selected by a multiple system operator (MSO), content creator, content provider, and/or content delivery platform and received by a video player over video link 104 for playing or streaming. According to an exemplary embodiment, the video link 104 can include a wired or wireless connection such as a local area network (LAN), a wide area network (WAN), a mobile communication network, a satellite network, the Internet, fiber optics, coaxial cable, infrared, radio frequency (RF), or any combination thereof.

According to an exemplary embodiment, the reference video data (e.g., stream) 104 can be received over the video link 106 can be transmitted according to one of a plurality of available broadcasting formats such as digital video broadcasting (DVB) standard, which includes of high definition television (HDTV) format, standard-definition television (SDTV) format, ultra-high-definition television (UHDTV) format, or any other suitable broadcasting format as desired. For example, the HDTV formats can include 1280×720 pixels in progressive scan mode (abbreviated 720p) or 1920×1080 pixels in interlaced video mode (1080i). UHDTV formats including at least 4K and 8K can present native video at a minimum resolution of 3840×2160 pixels. According to other exemplary embodiments, the video data can transmitted according to one of a plurality of modulation schemes such as, orthogonal frequency-division multiplexing (OFDM) modulation, eight-level vestigial sideband (8VSB), digital terrestrial television (DVB-T), quadrature amplitude modulation (QAM), Coded OFDM (COFDM) in combination any of a plurality video coding formats such as H.262/MPEG-2, H.265/MPEG-H, H.264/MPEG-4, VC-1, Audio Video Coding Standard (AVS) or any other suitable coding format as desired.

The data flow 100 can include a video recording feature 108 in which one or more frames of the reference video stream 104 are extracted and modified to include a unique label. The labeled video stream 110 is recorded and stored in on-board memory or a network memory location. The labeled video stream 110 is streamed or played according to the video streaming feature 102, and while being played random noise is introduced into at least one pixel element of one or more frames of the labeled video stream 110 to generate a degraded video stream 112. The random noise simulates one or more distortions which impair video quality. The degraded video is recorded according to the video recording feature 108.

The data flow 100 can include a video frame comparing feature 114 in which one or more frames of the reference video stream are compared to one or more corresponding frames of the degraded video stream 112 to generate one or more difference frames 116. An image frame annotating feature 118 is used to annotate at least one of the one or more difference frames according to a corrupted region of the one or more difference frames 116. According to an exemplary embodiment, a small window is swept over the entire image frame to detect or identify corrupted regions in the one or more difference frames 116 and generate an annotation record 120.

Figure 2:
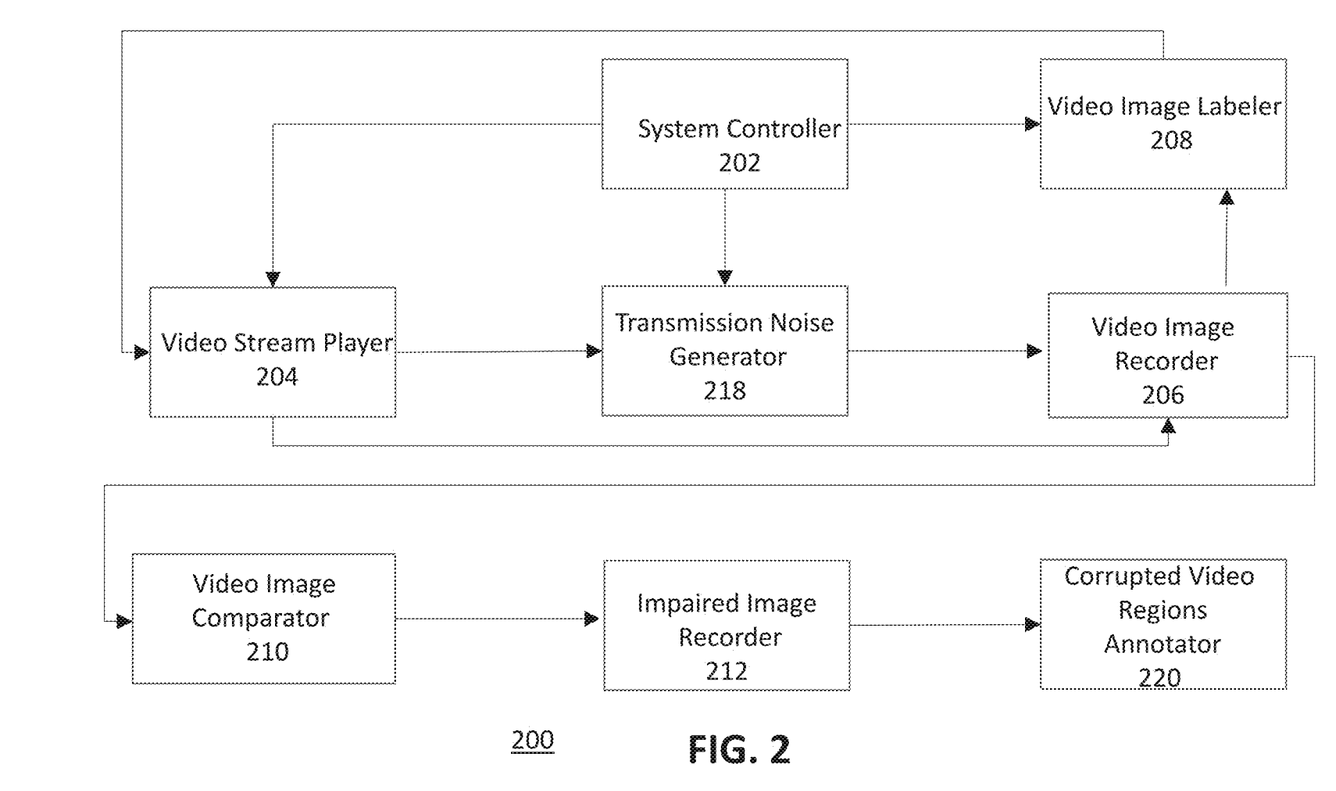
FIG. 2 illustrates a system for annotating training data for video quality impairment detection in accordance with an exemplary embodiment of the present disclosure.

FIG. 2 illustrates a system 200 for annotating training data for video quality impairment detection in accordance with an exemplary embodiment of the present disclosure.

The system 200 can include a combination of hardware and software components such as one or more processors or computing devices configured with program code for performing the operations of a system controller 202, a video stream player 204, a video image recorder 206, a video image labeler 208, a video image comparator 210, and an impaired image recorder 212.

According to an exemplary embodiment, the system controller 202 can be configured to select the reference video stream 104 of known good-quality from memory, a network storage location such as cloud storage, for example, a database, or any other suitable storage device or storage means as desired. In selecting the reference video stream 104, the system controller 202 can be configured to generate a user prompt or user interface for output to a display. The user prompt or interface can include a field or window which lists one or more candidate reference video streams available for selection by a user or operator. According to another exemplary embodiment the user prompt or interface can include a field or window in which a filename associated with a specified video stream can be manually input. After selection of the reference video stream 104 at or by the system controller 202, the video stream player 204 may receive the reference video stream 104 over a video link 106 for playing or streaming. During playback or streaming, the video stream player 204 may be connected to output the reference video stream 104 to the output device, such as a display device.

The display device can include any one of various types of displays including light emitting diode (LED), micro-LED, organic LED (OLED), active-matrix organic LED (AMOLED), Super AMOLED, thin film transistor (TFT), TFT liquid crystal display (TFT LCD), in-plane switching (IPS), or any other suitable display type as desired. According to an exemplary embodiment, the display device can be configured to have a resolution at any of 8K, 4K, 2K, high definition (HD), full HD, and a refresh rate including any one of 60 Hz, 90 Hz, 120 Hz or any other suitable resolution and refresh rate as desired.

As the reference video stream 104 is being played by the video stream player 204, the video image recorder 206 can decode and extract one or more images or image frames from the reference video stream 104. A video image labeler 208 can be connected to receive the one or more extracted images from the video image recorder 206 and modify the images by inserting or embedding a unique label or identifier for identifying each respective frame. According to an exemplary embodiment, the unique label can be a digit string, barcode, a Quick Response (QR) code, an alphanumeric string, or any other suitable code or format as desired. Once all the extracted images of the reference video stream 104 are labeled, the video image labeler 208 encodes the labeled images into a new labeled video stream 110.

The system controller 202 may generate a control signal instructing the video image labeler 208 to upload the labeled video stream 110 to the video stream player 204. The system controller 202 may instruct the video stream player 204 to play the labeled video stream 110 through a communication channel of the transmission noise generator 218. The transmission noise generator 218 can be commanded by the system controller 202 to introduce random noise into an associated communication channel. The random noise corrupts or distorts one or more elements in the image frames of the labeled video stream 110 such that a degraded video stream 112 is output from the communication channel or video link of the transmission noise generator 218. According to an exemplary embodiment, the random noise can be used to simulate degradations in a video link 106 over which the video stream can be transmitted and/or other types of distortions that can adversely impact the quality of streaming video content. According to an exemplary embodiment, the system controller 202 can be configured to generate command signals for controlling the transmission noise and impairment generator 218 according to a predetermined schedule. For example, the transmission noise generator 218 can be programmatically controlled by the system controller 202 over a network. The impedance of the transmission channel can be changed by random amounts within a specified range (e.g., approximately 50 ohms or 75 ohms or any other impedance value suitable for video communication or production as desired) in an increasing or decreasing direction every millisecond (e.g., rate of impairment) or other suitable interval as desired. According to an exemplary embodiment, the interval can be set at any suitable rate so long as the rate of impairment occurs faster than the period of the frame rate. For example, if a video signal has a frame rate of 30 frames per second where a frame is produced every 33.3333 ms, the rate of impairment should be less than or equal to 33.3333 ms. The transmission noise generator 218 can be configured to generate the random noise using one or more of a plurality of techniques which simulate conditions in the transmission channel or video link 106. For example, the transmission noise generator 218 can include a network-controlled varistor which generates a random impedance variation which simulates changes in the characteristic impedance of a transmission line or video link 106. It should be understood that other types of noise generation techniques and/or circuits can be implemented as desired.

The video image recorder 206 can record the degraded video stream 112 output from the transmission noise generator 218 of the video stream player 204. The system controller 202 may generate a control signal to command the video image recorder 206 to output the labeled video stream 110 and the degraded video stream 112 to the video image comparator 210. The video image comparator 210 may compare one or more corresponding frames of the labeled video stream 110 and the degraded video stream 112 to generate one or more difference video frames (e.g., images) 116. According to an exemplary embodiment, the corresponding frames of the labeled video stream 110 and the degraded video stream 112 are image frames which have the same identifier or label. The video image comparator 210 sends the one or more difference video frames 116 to the impaired image recorder 212 for storage and compilation.

The impaired image recorder 212 is configured to identify or detect a corrupt region in each difference frame. The corrupted regions annotator 220 may annotate at least one of the one or more difference frames 116 according to the corrupted region.

Figure 3A:
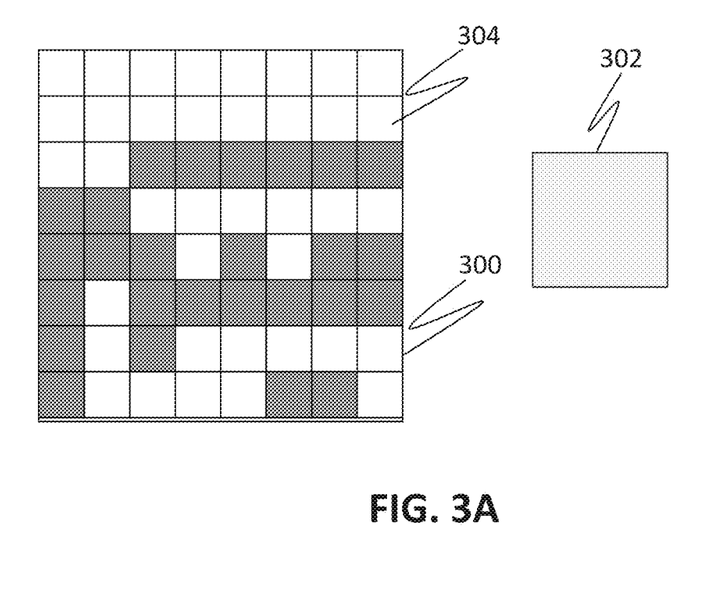
FIGS. 3A-3D illustrates a detection of a corrupted region in a difference frame according to an exemplary embodiment of the present disclosure.
Figure 3B:
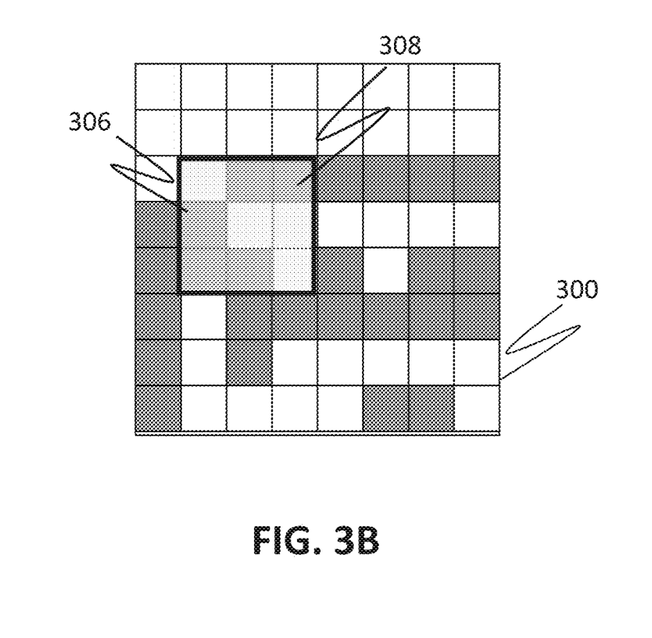
Figure 3C:
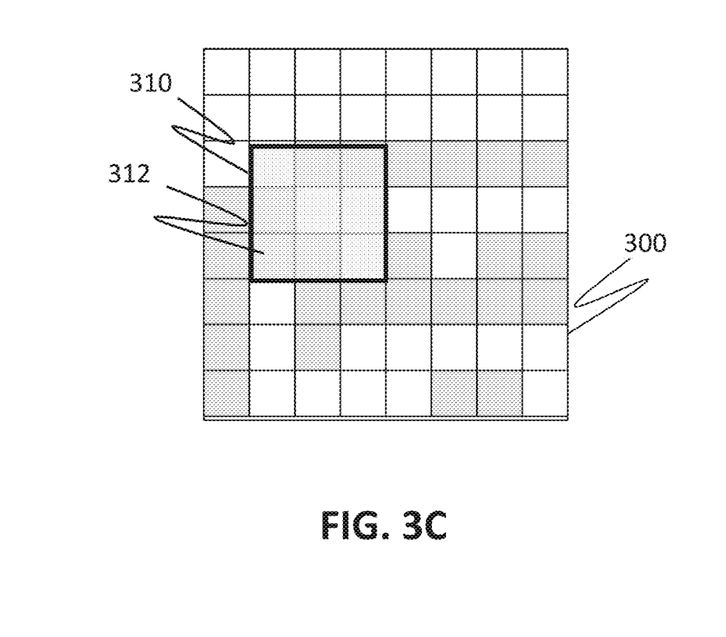
Figure 3D:
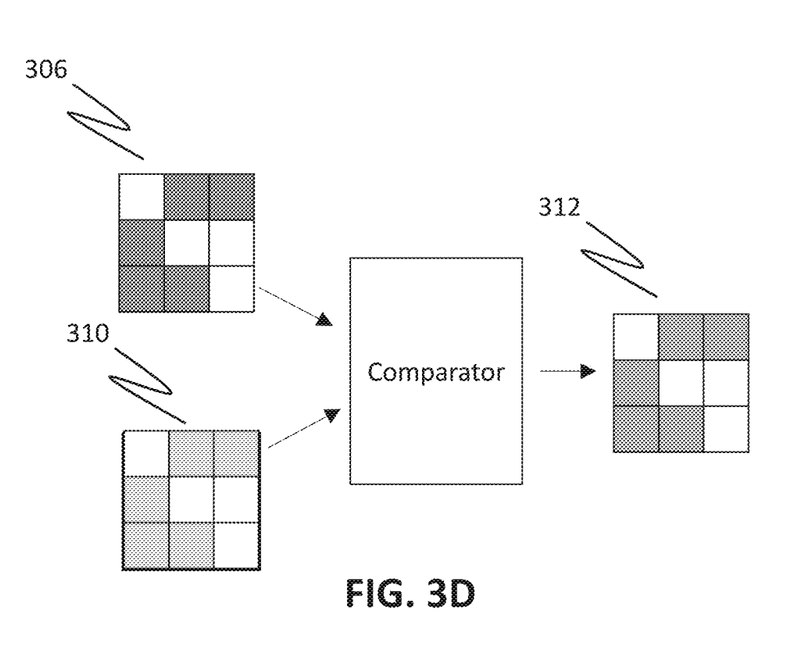

FIGS. 3A-3D illustrates a detection of a corrupted region in a difference frame according to an exemplary embodiment of the present disclosure. The impaired image recorder 212 can be configured to detect a corrupted region by scanning every element of the difference frame 300. For example, the detection can include a sweeping or passing a window 302 of a specified size (e.g., 16×16) over the entire difference frame 300 until each element is analyzed. For example, according to an exemplary embodiment, the window can include a 3×3, 4×4, 5×5, 16×16, or any suitably sized matrix of elements or macroblock as desired. As the window 302 is passed over a difference frame 300 a corrupted region corresponds to a non-empty pixel 308 of the at least one difference frame. The corrupted video regions annotator 220 is configured to generate a candidate list of bounding boxes 306, 310 which includes each window 306, 310 in which a non-empty pixel 308, 312 was detected in the difference images. The corrupted video regions annotator 220 can generate an annotation record including a final list of macroblock bounding boxes. To generate the final list, the corrupted video regions annotator 220 can compare a candidate bounding box of interest 306 to every other overlapping bounding box 310 (FIG. 3D). For each candidate bounding box 306, the corrupted video regions annotator 220 can remove any other bounding box 310 that overlaps the candidate bounding box of interest 306 and has a pixel density (e.g., number of non-empty pixels) higher than the pixel density of the candidate bounding box of interest 306. The resulting bounding box 312 can include pixel elements representing a difference between bounding boxes 306 and 310. According to an exemplary embodiment, if the images are pure black-and-white images where the pixels are either black or white, the comparator can behave as an "Exclusive-Or" gate as shown in Table 1.

TABLE 1

| Reference Image Pixel | Impaired Image Pixel | Difference Image Pixel |
|---|---|---|
| Black | Black | White |
| Black | White | Black |
| White | Black | Black |
| White | White | White |

According to another exemplary embodiment, if the images are gray scale images as shown in FIGS. 3B and 3C, the resulting difference pixels (FIG. 3D) will have a gray scale values representing a difference between the gray scale values of the two compared images.

Figure 4:
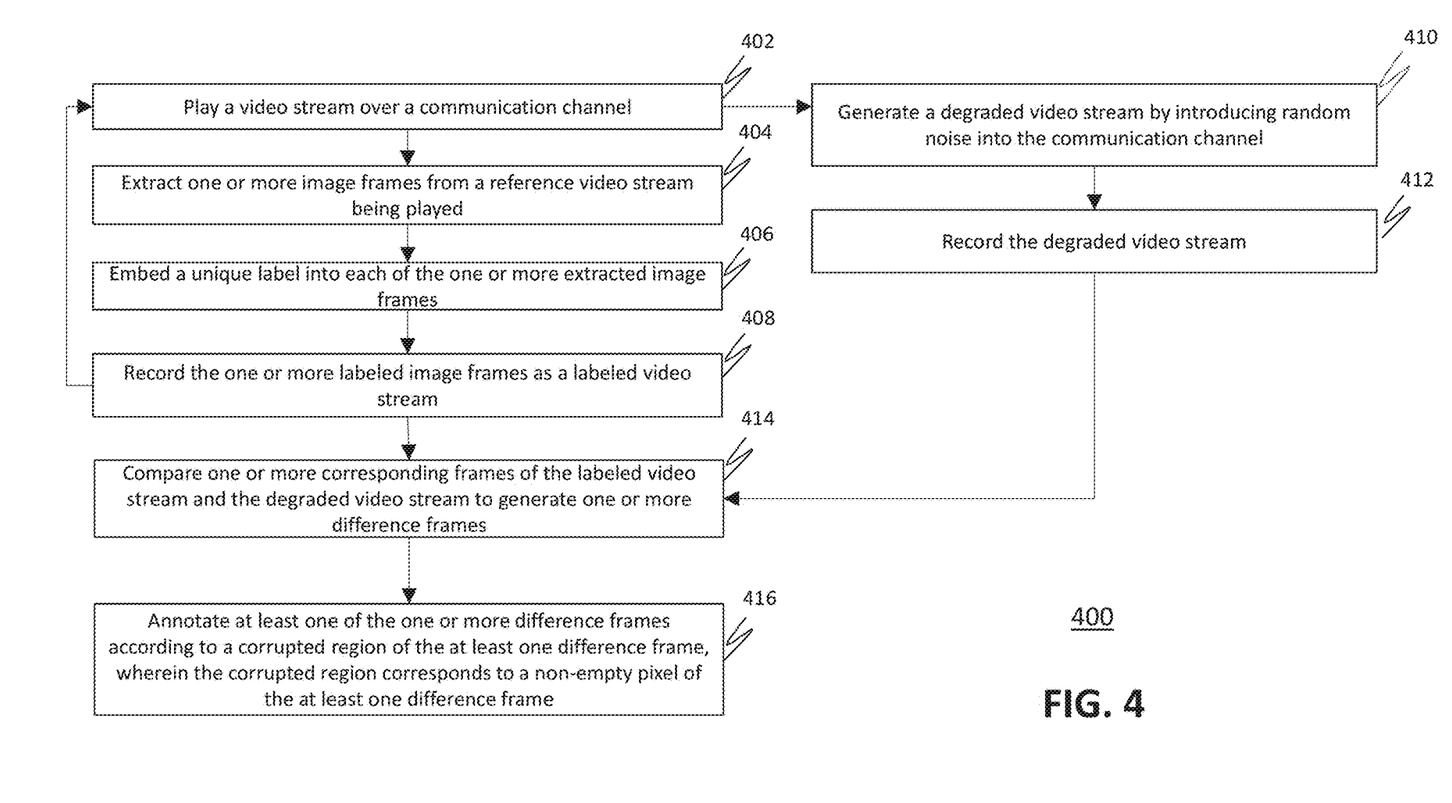
FIG. 4 illustrates a method for annotating training data for video quality impairment detection in accordance with an exemplary embodiment of the present disclosure.

FIG. 4 illustrates a method 400 for annotating training data for video quality impairment detection in accordance with an exemplary embodiment of the present disclosure.

As shown in FIG. 4, the method can include playing, via a video stream player 204, a video stream 104 over a video link 106 (step 402). According to an exemplary embodiment, the system controller 202 can generate a user interface for selecting a reference video stream 104 from memory or a database. Moreover, the video stream player 204 decodes the reference video stream 104 prior to it being played. The video stream recorder 212 can decode and extract one or more image frames from the reference video stream 104 as it is being played (step 404). A video image labeler 208 embeds a unique label, such as a bar code, a QR code, or an alphanumeric or numeric string, into each of the one or more extracted image frames (step 406). According to an exemplary embodiment, step 406 can also include the video image labeler 208 encoding the one or more labeled images into the labeled video stream 110. At step 408, the video stream recorder 212 records the labeled video stream 110. The system controller 202 can command the video image labeler 208 to upload the labeled video stream to the video stream player 110 and command the video stream player 204 to play the labeled video stream 110 through a communication channel including random noise introduced by the transmission noise generator 218 (Steps 402, 410). As the labeled video stream 110 is played through the communication channel of the transmission noise generator 218, random noise is introduced into and distorts or corrupts one or more pixel elements in the image frames of the labeled video stream 110 resulting in a degraded video stream 112. The random noise simulates degradations in the communication channel or video link 106 of the network or other distortions which impair quality of the video stream. According to an exemplary embodiment, the system controller 202 can generate one or more signals for controlling the transmission noise generator 218 to change transmission conditions on the communication channel, wherein the transmission conditions simulate the channel degradation. The degraded video stream 112 is recorded by the video image recorder 206 (step 412). In step 414, the video image recorder 206 sends the labeled video stream 110 and the degraded video stream 112 to the video image comparator 210, where one or more corresponding frames of the labeled video stream 110 and the degraded video stream 112 are compared to generate one or more difference frames 116. The frames of the labeled video and the degraded video stream correspond based on the respective embedded labels or identifiers. The impaired image recorder 212 annotates at least one of the one or more difference frames 116 according to a corrupted region of the at least one difference frame, wherein the corrupted region corresponds to a non-empty pixel of the at least one difference frame (step 416). The corrupted region the one or more difference images is identified determined by: applying a window to the one or more difference frames to identify the non-empty pixels, generating a list of candidate bounding boxes, where each candidate bounding box has an associated window with non-empty pixels, and filtering the list of candidate bounding boxes by removing any two bounding boxes which overlap another bounding box having a higher pixel density.

Figure 5:
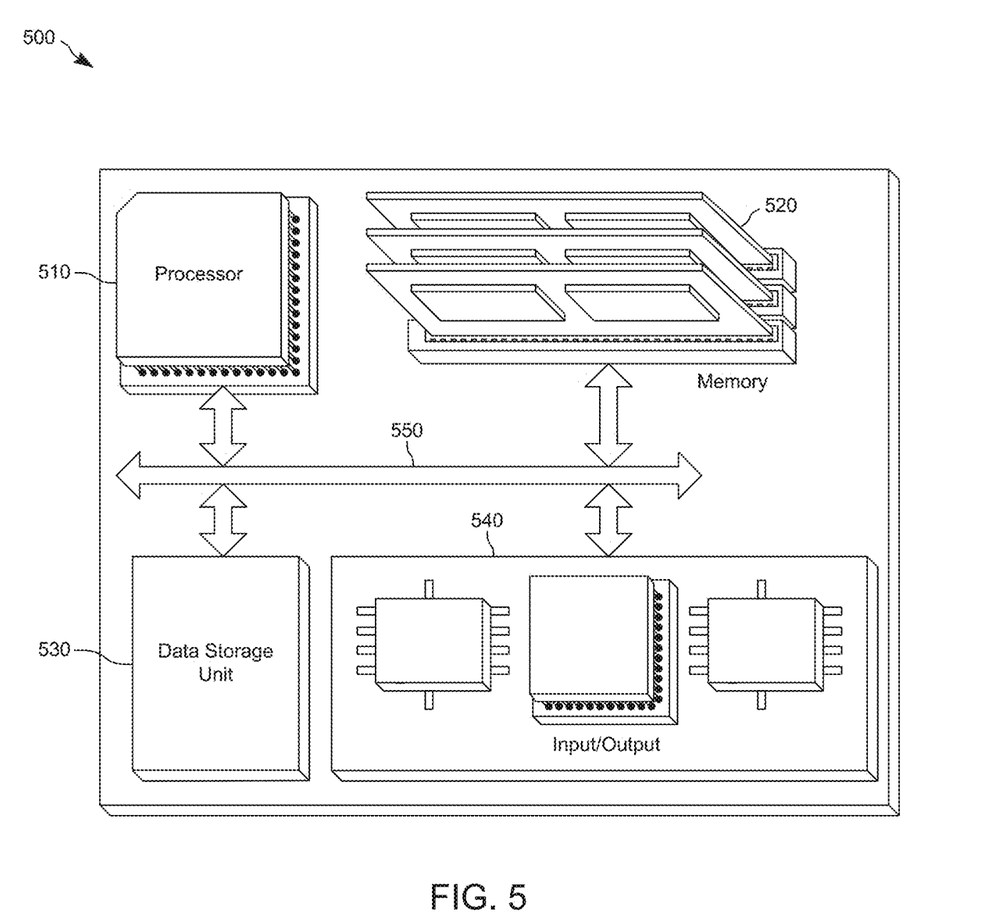
FIG. 5 is a block diagram of a hardware configuration 500 operable to facilitate the annotating training data for video quality impairment detection in accordance with an exemplary embodiment.

FIG. 5 is a block diagram of hardware configuration 500 operable to facilitate the annotating training data for video quality impairment detection in accordance with an exemplary embodiment. It should be understood that exemplary embodiments of the present disclosure can be implemented using one or more hardware configurations 500 having any combination of features, functions, and/or components described in the discussion that follows and connected to communicate over a network.

The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530. The processor 510 can be configured to execute graphical processing operations for performing one or more of image processing operations performed by the video stream player 204, video image recorder, video image labeler 208, video image comparator 210, impaired image recorder 212, and corrupted video regions annotator 220 as described herein. The processor 510 can also be configured to include additional circuits and components for implementing the transmission noise generator as described herein.

The memory 520 can store information within the hardware configuration 500. In one implementation, the memory 520 can be a computer readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 1700. In embodiments, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 110 of FIG. 1 (e.g., television, computer, tablet, mobile device, etc.). In embodiments, the input/output device can include driver devices configured to send communications to, and receive communications from one or more networks (e.g., subscriber network 120 of FIG. 1, WAN 115 of FIG. 1, etc.).

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method for annotating training data for video quality impairment detection, comprising:
   playing, via a video stream player, a video stream over a first communication channel;
   extracting, via a video stream recorder, one or more image frames from the video stream being played;
   embedding, via a video image labeler, a unique label into each of the one or more extracted image frames;
   recording, via the video stream recorder, the one or more labeled image frames as a labeled video stream;
   inputting, via a transmission noise generator, random noise into a second communication channel to form an impaired communication channel;
   playing, via the video stream player, the labeled video stream through the impaired communication channel to generate a degraded video, wherein the impaired communication channel distorts one or more elements of the one or more labeled frames of the labeled video stream with the random noise;
   comparing, via a video image comparator, one or more corresponding frames of the labeled video stream and the degraded video stream to generate one or more difference frames; and
   annotating, via an impaired image recorder, at least one of the one or more difference frames according to a corrupted region of the at least one difference frame, wherein the corrupted region corresponds to a non-empty pixel of the at least one difference frame.

2. The method of claim 1, further comprising:
   generating, via the system controller, a graphical interface for selecting the video stream from storage a memory location.

3. The method of claim 2, further comprising:
   receiving, at a network interface, the video stream over a communication link of a network according to a selection in the graphical interface.

4. The method of claim 1, further comprising:
decoding, via the video image recorder player, the one or more image frames of the video stream prior the extraction.

5. The method of claim 1, wherein the unique label is one of bar code, a QR code, and an alphanumeric string.

6. The method of claim 1, further comprising:
encoding, via the video image labeler, the one or more labeled frames as a new video stream.

7. The method of claim 1, further comprising:
generating, via a system controller, one or more signals for controlling the transmission noise generator to change an impedance of the second communication channel by random amounts.

8. The method of claim 1, further comprising:
recording, via the video stream recorder, the degraded video stream.

9. The method of claim 1, further comprising:
identifying the corrupted region of the at least one difference image by:
applying a window to the one or more difference frames to identify the non-empty pixels;
generating a list of candidate bounding boxes, where each candidate bounding box has an associated window with non-empty pixels; and
filtering the list of candidate bounding boxes by removing any two bounding boxes which overlap another bounding box having a higher pixel density.

10. A system for annotating training data for video quality impairment detection, comprising:
one or more processing devices configured to:
play, via a video stream player, a reference video stream over a first communication channel;
extract, via a video stream recorder, one or more image frames from the video stream being played;
embed, via a video image labeler, a unique label into each of the one or more extracted image frames;
record, via the video stream recorder, the one or more labeled image frames as a labeled video stream;
input, via a transmission noise generator, random noise into a second communication channel to form an impaired communication channel;
play, via the video stream player, the labeled video stream through the impaired communication channel to generate a degraded video stream, wherein the impaired communication channel distorts one or more elements of the one or more labeled frames of the labeled video stream with the random noise;
compare, via a video image comparator, one or more corresponding frames of the labeled video stream and the degraded video stream to generate one or more difference frames; and
annotate, via an impaired image recorder, at least one of the one or more difference frames according to a corrupted region of the at least one difference frame, wherein the corrupted region corresponds to a non-empty pixel of the at least one difference frame.

11. The system of claim 10, wherein the one or more processors is configured to:
compile, in the video stream recorder, the one or more labeled image frames into the labeled video stream.

12. The system of claim 10, wherein the one or more processors is configured to:
encode, via the video image labeler, the one or more labeled frames as a new video stream.

13. The system of claim 10, wherein the one or more processors is configured to generate, via a system controller, one or more signals for controlling the transmission noise generator to change an impedance of the second communication channel by random amounts.

14. The system of claim 10, wherein to identify the corrupted region of the at least one difference image, the one or more processors is configured to:
apply a window to the one or more difference frames to identify the non-empty pixels;
generate a list of candidate bounding boxes, where each candidate bounding box has an associated window with non-empty pixels; and
filter the list of candidate bounding boxes by removing any two bounding boxes which overlap another bounding box having a higher pixel density.

15. A non-transitory computer readable medium storing program code for causing one or more processors to perform operations, the operations comprising:
playing, via a video stream player, a video stream over a first communication channel;
extracting, via a video stream recorder, one or more image frames from the video stream being played;
embedding, via a video image labeler, a unique label into each of the one or more extracted image frames;
recording, via the video stream recorder, the one or more labeled image frames as a labeled video stream;
inputting, via a transmission noise generator, random noise into a second communication channel to form an impaired communication channel;
playing, via the video stream player, the labeled video stream through the impaired communication channel to generate a degraded video stream, wherein the impaired communication channel distorts one or more elements of the one or more labeled frames of the labeled video stream with the random noise;
comparing, via a video image comparator, one or more corresponding frames of the labeled video stream and the degraded video stream to generate one or more difference frames; and
annotating, via an impaired image recorder, at least one of the one or more difference frames according to a corrupted region of the at least one difference frame, wherein the corrupted region corresponds to a non-empty pixel of the at least one difference frame.

16. The non-transitory computer readable medium of claim 15 causing the one or more processors to perform operations further comprising:
identifying the corrupted region of the at least one difference image by:
applying a window to the one or more difference frames to identify the non-empty pixels;
generating a list of candidate bounding boxes, where each candidate bounding box has an associated window with non-empty pixels; and
filtering the list of candidate bounding boxes by removing any two bounding boxes which overlap another bounding box having a higher pixel density.

17. The non-transitory computer readable medium of claim 15 causing the one or more processors to perform operations further comprising:
encoding, via the video image labeler, the one or more labeled frames as a new video stream.

18. The non-transitory computer readable medium of claim 15 causing the one or more processors to perform operations further comprising:
generating, via a system controller, one or more signals for controlling the transmission noise generator to change an impedance of the second communication channel by random amounts.

\* \* \* \* \*